(12) United States Patent
Duis et al.

(10) Patent No.: US 12,345,917 B2
(45) Date of Patent: Jul. 1, 2025

(54) OPTICAL INTEGRATED CIRCUIT

(71) Applicant: PHIX B.V., Enschede (NL)

(72) Inventors: Jeroen Antonius Maria Duis, Enschede (NL); Johannes Cornelis Van Kerkhof, Enschede (NL)

(73) Assignee: PHIX B.V., Enschede (NL)

( * ) Notice: Subject to any disclaimer, the term of this patent is extended or adjusted under 35 U.S.C. 154(b) by 0 days.

(21) Appl. No.: 18/292,541

(22) PCT Filed: Jul. 28, 2022

(86) PCT No.: PCT/NL2022/050450
§ 371 (c)(1),
(2) Date: Jan. 26, 2024

(87) PCT Pub. No.: WO2023/009005
PCT Pub. Date: Feb. 2, 2023

(65) Prior Publication Data
US 2024/0264373 A1    Aug. 8, 2024

(30) Foreign Application Priority Data
Jul. 29, 2021   (NL) .................................... 2028885

(51) Int. Cl.
*G02B 6/122*     (2006.01)
*G02B 6/12*      (2006.01)
*G02B 6/13*      (2006.01)

(52) U.S. Cl.
CPC ............... *G02B 6/122* (2013.01); *G02B 6/13* (2013.01); *G02B 2006/12102* (2013.01)

(58) Field of Classification Search
CPC ................................... G02B 6/13; G02B 6/122
See application file for complete search history.

(56) References Cited

U.S. PATENT DOCUMENTS

| 6,270,261 | B1  | 8/2001  | Kawano          |         |
|-----------|-----|---------|-----------------|---------|
| 2019/0258175 | A1 | 8/2019 | Dietrich et al. |         |
| 2021/0373244 | A1* | 12/2021 | Saito .................... | G02B 6/32 |

OTHER PUBLICATIONS

Dietrich et al., "In situ 3D nanoprinting of free-form coupling elements for hybrid photonic integration," Nature Photonics, Mar. 26, 2018, 12(4):241-247.
International Search Report and Written Opinion in International Application No. PCT/NL2022/050450, dated Dec. 1, 2022, 13 pages.
International Preliminary Report on Patentability in International Application No. PCT/NL2022/050450, dated Nov. 2, 2023, 7 pages.

* cited by examiner

*Primary Examiner* — Michael P Mooney
(74) *Attorney, Agent, or Firm* — KDW Firm PLLC

(57) ABSTRACT

An optical integrated circuit includes a substrate, at least one open cavity provided in said substrate, at least one set of optical waveguides for each open cavity, each set including a first optical waveguide and a second optical waveguide. The first and second optical waveguides are arranged in the substrate and include a first end facet ending in the open cavity of that set, and a first collimating element for each set. The first collimating element is arranged in the open cavity at or near the first end facet of the first optical waveguide to collimate light from that waveguide. A second collimating element for each set is arranged in the open cavity at or near the first end facet of the second optical waveguide to collimate light into that waveguide. A method for fabricating the same.

19 Claims, 5 Drawing Sheets

OPTICAL INTEGRATED CIRCUIT

This application is a national stage filing under 35 U.S.C. 371 of pending International Application No. PCT/NL2022/050450, filed Jul. 28, 2022, which claims priority to Netherlands patent application 2028885, filed Jul. 29, 2021, the entirety of which applications are incorporated by reference herein.

FIELD OF INVENTION

The present invention relates to optical integrated circuits for integrating an optical component, for integrating in particular an optical isolator, and a method for fabricating such optical integrated circuits.

BACKGROUND

Optical isolation is a typical optical function used in polarized and unpolarized light circuits to avoid reflected light disturbing the performance of the circuits. In essence an optical isolator ensures a unidirectional transmission of light. Isolators of the prior art have been developed comprising typically two polarizers and in between a Faraday rotator (a crystal) and are typically assembled together as a bulk component. To feed light to such a bulk optical isolator, two GRIN lenses (gradient-index lenses) have been used to collimate light in and out of the isolator, their flat surfaces being arranged in close proximity with the interface surfaces of the isolator. Such lenses have to be polished by hand, assembled individually with the isolator on a board as well as aligned with said isolator. The fabrication of such lenses as well as the assembling of such lenses on a board with the isolator, due to their dimensions, are thus both cumbersome processes, suffering drawbacks in terms of scalability, accuracy and costs.

SUMMARY

The object of the invention is to provide an optical integrated circuit for integrating an optical component capable of overcoming the above-mentioned drawbacks of the prior art.

According to a first aspect of the invention, an optical integrated circuit comprises a substrate, at least one open cavity provided in said substrate, at least one set of optical waveguides for each open cavity. Each set comprises a first optical waveguide and a second optical waveguide, wherein the first optical waveguide and the second optical waveguide of a set are each arranged in the substrate and each comprise a first end facet ending in the open cavity of that set. The optical integrated circuit further comprises a first collimating element for each set, the first collimating element of a set being arranged in the open cavity of that set at or near the first end facet of the first optical waveguide of that set to collimate light from that first optical waveguide, and a second collimating element for each set, the second collimating element of a set being arranged in the open cavity of that set at or near the first end facet of the second optical waveguide of that set to collimate light into that second optical waveguide.

In this way, the collimating elements are incorporated at substrate level in an optical integrated circuit, while a cavity is provided for an optical component, leading to a more scalable design and reduced costs. The alignment between the optical waveguides and the collimating elements is in particular dealt with at substrate level.

In the art, an optical integrated circuit may also be referred to as a photonic integrated circuit (PIC). By optical integrated circuit or photonic integrated circuit is meant a device that integrates multiple (at least two) photonic functions on a substrate (or chip). By substrate (or wafer) is typically meant the base layer of a structure such as a chip or a printed circuit board. Semiconductor technologies are typically used to integrate on one substrate (or chip) the multiple functions of the circuit. In that sense, a photonic integrated circuit (PIC) or integrated optical circuit is similar to an electronic integrated circuit. The fabrication techniques are similar to those used in electronic integrated circuits in which photolithography is used to pattern wafers for etching and material deposition. The major difference between photonic integrated circuits and electronic integrated circuits is that a photonic integrated circuit provides functions for information signals imposed on optical wavelengths typically in the visible spectrum or near infrared.

According to a preferred embodiment, arranged in the cavity cured but not (fully) processed material is provided acting as a mechanical support for supporting the first and second collimating elements. In this way, the first and second collimating elements may be protected for further processing, increasing thus the yield of production.

According to a preferred embodiment, the first optical waveguide and the second optical waveguide of a set are different segments of an optical waveguide that is interrupted by the open cavity of that set. In this way, the accuracy of the alignment of the first and the second optical waveguides can be improved. Alternatively, the optical paths of the first optical waveguide and of the second optical waveguide may be intersecting. In particular the optical path of an optical waveguide may substantially have an angle with an axis perpendicular to the end facet of that optical waveguide. The angle between the optical line and an axis perpendicular to the end facet of an optical waveguide may reduce reflections between that optical waveguide and the collimating element at or near the end facet of that optical waveguide. The angle may be dependent on the mode field diameter and the numerical aperture of an optical waveguide.

According to a preferred embodiment, each of the first and second collimating elements comprises one or more micro lenses. In this way, an optical waveguide can be efficiently connected to the optical component without losing light in the cavity. The one or more micro lenses on each side collimate the light coming out of the end facet of the first optical waveguide to a bundle reaching the optical component, respectively coming out of the isolator to a bundle reaching the end facet of the second optical waveguide. In particular, the one or more micro lenses are adapted to the wavelength of the light to be received.

According to a preferred embodiment, the first and second collimating elements are made of processed and cured photo-sensitive material, preferably the first and second collimating elements are made of polymerized and cured photo-sensitive material, or irradiated and cured photosensitive material, more preferably the first and second collimating elements are made of polymerized and cured epoxy resin, or irradiated and cured glass. In this way, accuracy of the positioning may be ensured while the ease of fabrication may be improved. By photo-sensitive material is understood a material that is sensitive to the action of light, and in particular a material having optical properties, in particular a refractive index, which can be modified by the action of light.

According to a preferred embodiment, the optical integrated circuit further comprises at least one optical component arranged in each open cavity between the first and the second collimating elements of the at least one set of that open cavity, said optical component being configured to perform an optical function. In this way, the collimating elements and the optical component are incorporated at substrate level in an optical integrated circuit, leading to a more scalable design and reduced costs. The alignment between the optical waveguides, the collimating elements and the optical component is in particular dealt with at substrate level.

According to a preferred embodiment, the optical integrated circuit comprises at least two sets of optical waveguides for each open cavity, wherein the optical component of an open cavity is shared by the at least two sets of optical waveguides for that open cavity. In this way a multi-channels integrated circuit may be provided on a single substrate increasing the scalability of the design.

According to a preferred embodiment, the optical component is for performing one of the following functions: optical isolation, sensing or beam splitting, beam deflection or plasmonics. In particular the optical component is one of an optical isolator, a drop of fluid or a beam manipulator. The list mentioned is not exhaustive and a skilled person would, depending on circumstances, understand that the principle of the invention may be applied to other types of optical functions and for other types of optical components which would benefit from being integrated in a PIC environment.

According to a preferred embodiment, the optical component is a bulk optical component. By bulk element is understood a separate element which can be provided as a sub assembly typically having micro or mm dimensions. For example the bulk component may be an off the shelf component. In this way a hybrid level of integration is achieved with on the one hand the wave guiding and collimation being totally integrated at substrate level, while the optical function may remain at macro level.

According to a preferred embodiment, the optical integrated circuit comprises at least two open cavities provided in said substrate. In this way a multi-channels and multi-functions integrated circuit may be provided on a single substrate increasing the scalability of the design. It is noted that the optical components in the cavities may be the same or different. Further multi/channels for each cavity may as well be used for this embodiment.

According to a preferred embodiment, the at least one optical component is arranged in a recess created when removing non-cured material from the cavity after forming the first and second collimating element and the mechanical support thereof. In this way, the optical element may be easily inserted inside the remaining cavity and placed in close proximity to the collimating elements. The proximity between the collimating elements and the optical element may insure an efficient optical coupling.

According to a preferred embodiment, a binding material is provided in the cavity for the optical component to the cavity. In this way a mechanical binding is realized as well as an optical binding to the collimating elements. In particular, the binding material has a refractive index close to the refractive index of the material of the collimating elements. In this way, reflections are mitigated and an efficient optical integrated circuit is obtained. More in particular, the binding material may be a cured photo-sensitive material, for example a cured resin or cured glass. In particular the binding material may be the photo-sensitive material used for the collimating elements. When using the photo-sensitive material used for the collimating elements, a simple and cheaper optical integrated circuit is obtained, while when using another photo-sensitive material for binding only, the binding characteristics may be adapted to the environmental constraints of a specific application (vibrations, moisture, etc.).

According to a preferred embodiment, the substrate is made of one of the following: a photo-sensitive substrate or a semiconductor wafer, preferably the substrate is made of one of the following: a polymer substrate, a glass substrate, a silicon wafer, silicon dioxide wafer, a lithium niobate wafer, a Gallium Arsenide wafer or an indium phosphide wafer. In this way, the substrate and the optical integrated circuit based on such a substrate is directly compatible with other substrate technology circuits.

According to a further embodiment, an optical integrated module is provided comprising a packaging with input and output interfaces, and an optical integrated circuit according to any of the above claims, arranged inside said packaging, wherein at least a first optical waveguide is connected directly or indirectly to the input interface and/or at least a second optical waveguide is connected directly or indirectly to the output interface. In this way, a modular design and product may be realized to meet the needs of the intended use.

According to a further embodiment, the module further comprises a pre-processing stage for processing one or more light signals to be guided in the one or more first optical waveguides and/or a post-processing stage for processing one or more light signals from the one or more second optical waveguides, in particular wherein the pre-processing stage comprises a laser integrated circuit and/or a spotsize converter, and/or the post-processing stage comprises a spot-size converter for adapting the mode size. In this way a packaged element that can be used as a building block for a process design kit in photonics can be obtained.

According to another embodiment of the invention, a method for fabricating an optical integrated circuit according to the previous embodiments is provided. The method comprises the steps of providing a substrate with one or more optical waveguides arranged in the substrate; forming, for example by means of etching, at least one open cavity in the substrate thereby forming at least one set of optical waveguides for each open cavity, each set comprising a first optical waveguide and a second optical waveguide. The first optical waveguide and the second optical waveguide of a set are each arranged in the substrate and each comprise a first end facet ending in the open cavity of that set. The method further comprises forming in the open cavity of a set and for each set, a first collimating element at or near the first end facet of the first optical waveguide of that set and a second collimating element at the first end facet of the second optical waveguide of that set.

In this way, the precision of the alignment of all optical components is improved to the level of precision of the etching and the forming step of the collimating elements. The accuracy of the fabrication processed is thus increased.

According to a preferred embodiment, forming, for example by means of etching, at least one open cavity comprises etching the open cavity through at least one optical waveguide interrupting at least that optical waveguide in different segments thereby forming at least one set of optical waveguides for each open cavity. In this way, the accuracy of the alignment of the first and the second optical waveguides can be improved. Alternatively, etching at least one open cavity and forming at least one set of optical waveguides for each open cavity are two separate steps, and comprises the step of forming a first and second optical waveguides having optical paths intersecting each other. In particular, forming at least one set of optical waveguides may comprise forming an optical waveguide having an optical path substantially at an angle with an axis perpendicular to the end facet of that optical waveguide. The angle between the optical path and an axis perpendicular to the end facet of an optical waveguide may reduce reflections between that optical waveguide and the collimating element at or near the end facet of that optical waveguide. The angle may be dependent on the mode field diameter and the numerical aperture of an optical waveguide.

According to a preferred embodiment, forming the collimating elements comprises 3D printing the collimating elements. Alternatively, forming the collimating elements comprises 3D etching the collimating elements. In this way, manual manipulation is no longer required. Automatization of the fabrication method is thus rendered possible increasing efficiency, scalability while reducing costs and time of fabrication.

According to a preferred embodiment, forming the collimating elements comprises filling the cavity of a set with a first photo-sensitive material, locally processing said first photo-sensitive material and subsequently curing the processed photo-sensitive material to obtain the first and second collimating elements, preferably processing comprises polymerizing or irradiating to respectively obtain polymerized or irradiated first photo-sensitive material. In this way, a precise positioning of the collimating element at the end-face of the optical waveguide is rendered possible, avoiding diffraction into the cavity, and enabling thus the incorporation of the optical component in the cavity.

According to a preferred embodiment, the method further comprises the subsequent steps of removing at least part of the non-processed first photo-sensitive material from the open cavity of that set, refilling the open cavity of that set with a second photo-sensitive material and after the inserting step, curing said second photo-sensitive material. In this way, room can be made to insert the optical component and the mechanical characteristics of the second photo-sensitive material, acting as binding material, may be adapted to the environmental constraints of a specific application (vibrations, moisture, etc.).

According to a preferred embodiment, forming the collimating elements is performed by two photon absorption laser lithography. In this way, a fine structure may be created in the available cavity space.

According to a preferred embodiment, the method further comprises inserting at least one optical component in each open cavity between the first and the second collimating elements of the at least one set of that open cavity, said optical component being configured to perform an optical function. In this way, the collimating elements and the optical component are incorporated at substrate level in an optical integrated circuit, leading to a more scalable design and reduced costs. The alignment between the optical waveguides, the collimating elements and the optical component is in particular dealt with at substrate level.

According to a preferred embodiment, providing a substrate with one or more optical waveguides arranged in the substrate comprises providing a first substrate portion with one or more optical waveguides arranged in the substrate, and at least one second substrate portion incorporating at least one of a pre-processing stage for processing one or more light signals to be guided in the one or more first optical waveguides or a post-processing stage for processing one or more light signals from the one or more second optical waveguides. In this way the fabrication process of multiple functions may be simplified, leading to high scalability, better accuracy and reduced costs.

According to a preferred embodiment, the method further comprises packaging the optical integrated circuit as a module in a packaging comprising input and output interfaces, wherein at least a first optical waveguide is connected directly or indirectly to the input interface and/or at least a second optical waveguide is connected directly or indirectly to the output interface. In this way a practical product may be delivered, with multiple types of interfaces depending on the use intended. In particular packaging further comprises packaging the optical integrated circuit with additional separate elements, in particular with a separate spot size converter for adapting the optical mode size. In this way a packaged element that can be used as a building block for a process design kit.

It is further noted that although some steps may have been described in a certain order, the invention should be understood in a broader sense, and the method of the invention should be understood as covering other orders of steps as long as logically possible.

BRIEF DESCRIPTION OF THE FIGURES

This and other aspects of the present invention will now be described in more detail, with reference to the appended drawings showing currently preferred embodiments of the invention. Like numbers refer to like features throughout the drawings

DESCRIPTION OF THE EMBODIMENTS

Figure 1:
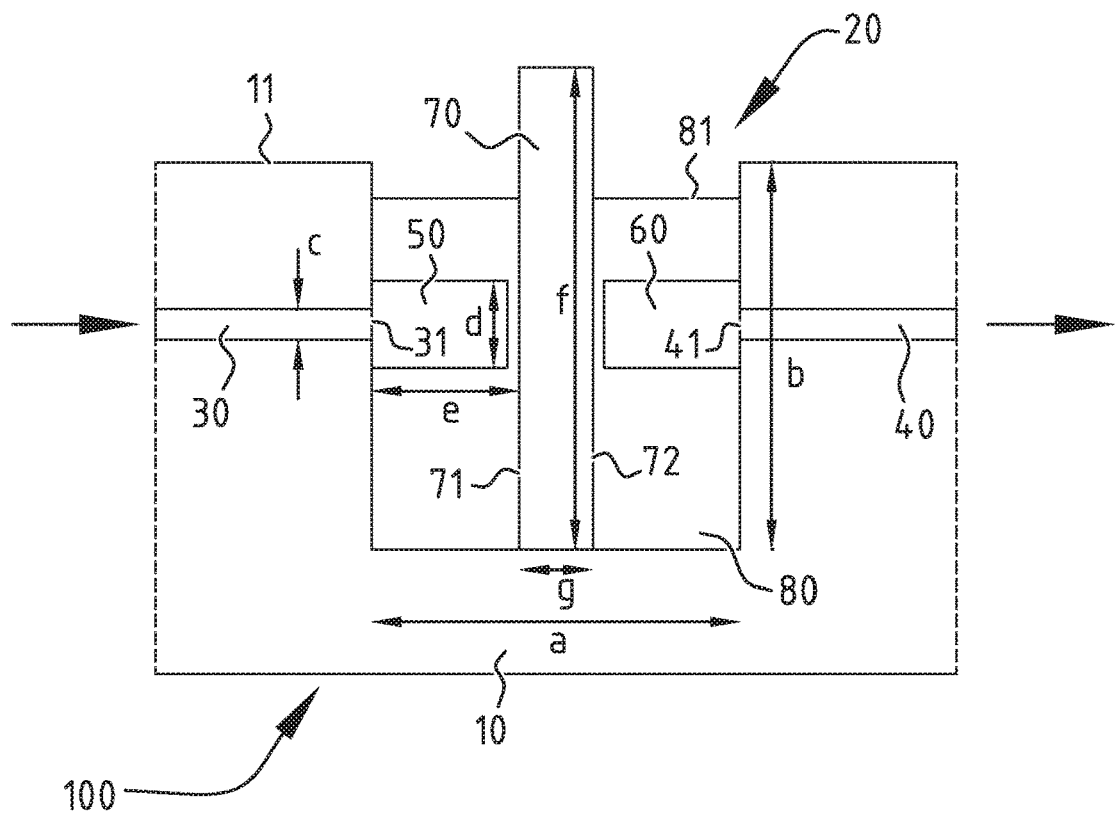
FIG. 1 illustrates a schematic cross section view of an optical integrated circuit according to an embodiment.

FIG. 1 illustrates a schematic cross section view of an optical integrated circuit according to an embodiment. FIG. 1 shows an optical integrated circuit 100 for performing an optical function realized by an optical component 70 to incoming light represented by an arrow coming into the optical integrated circuit 100 and delivering out-going light represented by an arrow leaving the optical integrated circuit 100. In particular the optical function may be optical isolation, such that the optical component 70 may be an optical isolator comprising typically a crystal and two polarizers, the crystal being arranged in between the two polarizers.

The optical integrated circuit 100 comprises a substrate 10, an open cavity 20 provided in said substrate 10, a set of a first optical waveguide 30 and a second optical waveguide 40, each arranged in the substrate 10 to guide light. It is noted that the open cavity 20 may also be referred to in the rest of the text simply as the cavity. The first and second optical waveguides 30 and 40 may for example be buried in the substrate 10. Alternatively the first and second optical waveguides 30 and 40 may be embedded in the substrate 10. The skilled person would understand that other optical waveguide solutions may further be envisaged for as long as compatible with the concept behind the present invention.

The substrate 10 may be a semi-conductor wafer. It is noted that the term substrate may here refer to a multi-layer multi-material structure. Alternatively the substrate may refer to a single layer, single material structure, like for instance a glass substrate or a polymer substrate. The semi-conductor wafer 10 may for example be based on silicon or indium phosphide technology. The optical waveguides 30 and 40 may for example be made of an insulating material, such as silico nitride, at least partially surrounded by one or more cladding layers, such as silicon dioxide. The optical waveguides 30 and 40 may have a dimension c, said dimension being adapted to the wavelength of the light to be received by the optical integrated circuit 100. The optical waveguides 30 and 40 may have a substantially circular section or may have the shape of a substantially flat stripe. Other embodiments for the optical waveguides may yet be envisaged. The first optical waveguide 30 and the second optical waveguide 40 may be different segments of an optical waveguide that is interrupted by the open cavity 20. In other words, the first and second optical waveguides 30 and 40 may be formed by the etching of the cavity 20 through an optical waveguide initially provided in the substrate 10.

The first optical waveguide 30 and the second optical waveguide 40 each comprise a respective first end facet 31 and 41 ending in said cavity 20. The end facets 31 and 41 may be arranged at opposite side faces of the cavity 20. A first collimating element 50 is arranged in the cavity 20 at the first end facet 31 of the first optical waveguide 30 to collimate light from the first optical waveguide 30, while a second collimating element 60 is arranged in the cavity 20 at the first end facet 41 of the second optical waveguide 40 to collimate light into the second optical waveguide 40. The first collimating element 50 may collect all the light coming out of the end facet 31 and shape the beam of light to create a bundle of collimated light rays. Similarly the second collimating element 60 may collect all the light coming out of the optical component 70 and shape the beam of light to create a bundle of collimated light rays entering the end facet 41 of the second optical waveguide 40.

Alternatively in an embodiment not represented, the end facets 31 and 41 may be arranged on the same side face of the open cavity 20, while the opposite side face of the open cavity may be reflecting surface. Light coming from the first waveguide may travel through the cavity, be reflected back and coupled then in a second waveguide on the same side face of the open cavity as the first optical waveguide. This embodiment may be used with wavelength selective filters for devices like add drop multiplexers.

In a further not represented embodiment, at least one of the first or the second optical waveguide 30,40 may comprise at or near the open cavity 20 at least one taper, such that at least one end facet 31, 41 may then be arranged at the extremity of the at least one taper.

The optical component 70, for example an optical isolator, may be arranged in the cavity 20 between the first and the second collimating elements 50 and 60. The optical component 70 may be configured to perform a given optical function, for example to perform optical isolation. The first and second collimating elements 50 and 60 as well as the optical waveguides 30 and 40 may be aligned such that light entering the integrated circuit may travel along one substantially straight optical path. The side faces of the optical component 70 may be substantially perpendicular to the optical path defined by the first and second collimating elements 50 and 60 as well as the optical waveguides 30 and 40. The optical component 70 may be a bulk element, with a height f in the millimeter range. The optical component 70 may have a depth g in the direction of the optical path, defined by the distance between an input surface 71 oriented towards the incoming light, i.e. towards the end facet 3,1 and an output surface 72 oriented towards out-going light, i.e. towards the end facet 41.

The open cavity 20 may be an opening etched from an upper surface 11 of the substrate 10, and may also be qualified as a recess in the substrate. The cavity 20 may have a length a, in between opposite side faces housing the end facets 31 and 41, and a depth b from the upper surface 11 of the substrate 10, each adapted to the dimensions of the optical component 70 and the collimating elements 50 and 60. In an example, the depth b may be one to several hundreds of micrometers while the length a may be in the order of one to several millimeters. The depth b may for example be smaller than the height f of the optical component 70, which may protrude above the upper surface 11 of the substrate 10. The selection of the different proportions for the distance a, b, c and d may come within the scope of the customary practice based on considerations including among other the dimension e of the optical component 70, the materials used for the optical waveguides 30, 40 and the substrate 10. As explained above, the first and second optical waveguides 30 and 40 may be formed by the etching of the cavity 20 through an optical waveguide initially provided in the substrate 10. In other words, the open cavity 20 may interrupt an optical waveguide, creating two segments labelled as first and second optical waveguides 30 and 40.

The first and second collimating elements 50 and 60 may be made of polymerized and cured photo-sensitive material. The first and second collimating elements 50 and 60 may be manufactured by additive manufacturing, also referred to as 3D printing, directly in situ, i.e. in the open cavity 20. These elements 50 and 60 may be manufactured by two-photon laser lithography directly in the cavity 20. Two-photon laser lithography uses laser for creating small features in a photo-sensitive material without the use of complex optical systems or photomasks. This method relies on a multi-photon absorption process in a material that is transparent at the wavelength of the light used for creating the pattern. By scanning and properly modulating the laser, polymerization occurs at the focal spot of the laser and can be controlled to create arbitrary three-dimensional periodic or non-periodic patterns.

Each of the first and second collimating elements 50 and 60 may have a diameter d at the first end facets 31 and 41 substantially larger than the dimension c of the optical waveguides 30, 40 and a length e in the direction of the optical path to collimate efficiently. Each of the first and second collimating elements 50 and 60 may comprise one or more micro lenses. By micro-lenses are understood lenses having a diameter smaller than a millimeter, preferably between one micron and 200 microns, more preferably between one micron and 100 microns, typically in the range of one to several tens of microns. The one or more micro-lenses may have dimensions and/or shapes depending on the wavelength of the light to be received.

The length a of the cavity 20 may be larger than the sum of the depth g of the optical component 70 plus two times the length e of the collimating elements 40 and 50. During the fabrication process a gap larger than the depth g of the optical component 70 may be provided between the collimating elements 50 and 60 to allow the insertion of the optical component 70 after the fabrication of the collimating elements 50 and 60. A binding material 80 may, after insertion of the optical component 70, be provided in the cavity 20 in between the elements 50, 60, 70 and the edges of the cavity to bind all elements 50-70 in place inside the cavity 20. In particular a gap in between the collimating elements 50, 60 and the surfaces 71 and 72 of the optical component 70 may be filled with a material 80 having a reflective index close to the reflective index of the material used to form the collimating elements 50 and 60. The substantially small difference in reflective indexes between the material 80 and the material of the collimating elements 50 and 60 may be selected in order to avoid reflections at the interface between these materials. Typically the difference in reflective indexes is between 0.001 and 0.06. In this way, no anti-reflection coating is needed. The forming of the collimating elements 50 and 60 using such a technique therefore additionally solves the problem of applying antireflective coating precisely on small structures. Alternatively a binding material 80 may, before insertion of the optical component 70, be provided in the cavity 20 in between the elements 50, 60, 70 and the edges of the cavity to bind all elements 50-70 in place inside the cavity 20. A skilled person would know depending on the selected binding material, whether to fill the cavity with the binding material before or after the insertion of the optical component.

Figure 2:
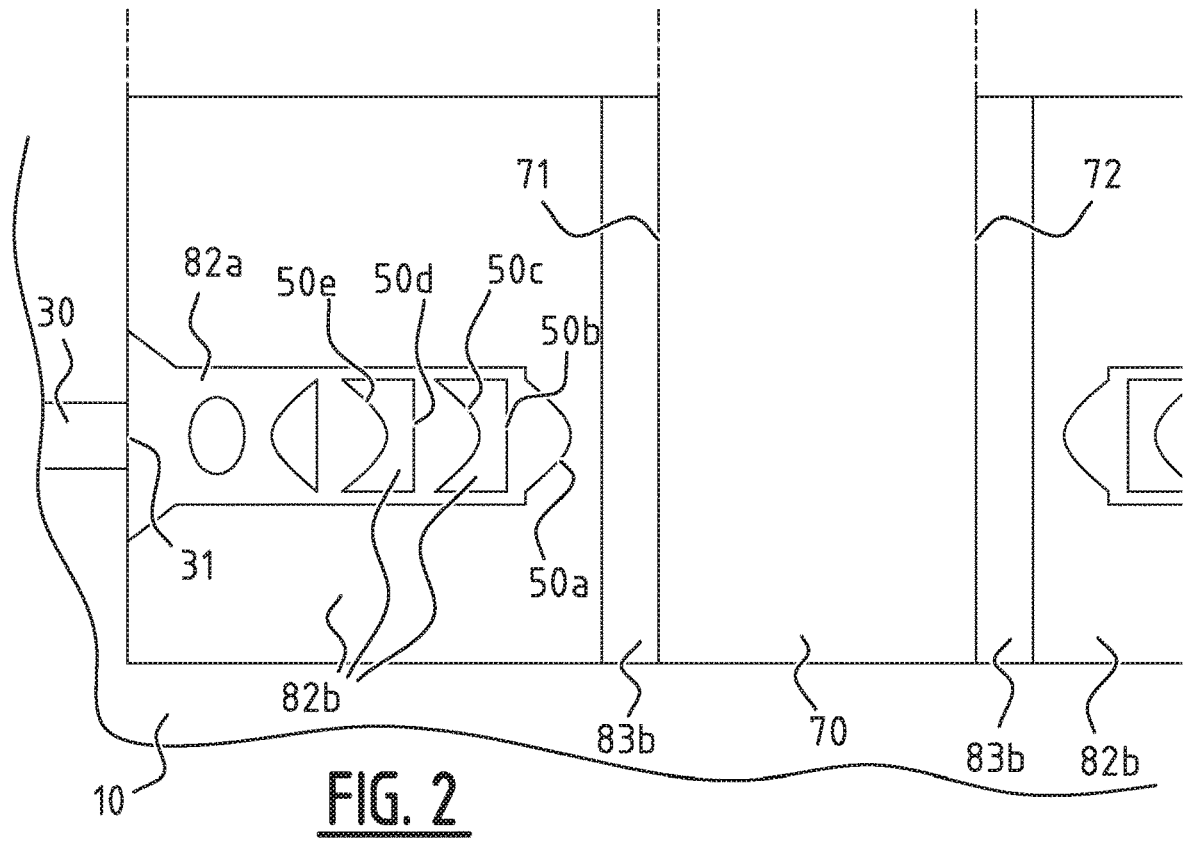
FIG. 2 illustrates an enlarged view of a schematic cross section view of an optical integrated circuit according to another embodiment.

FIG. 2 illustrates an enlarged view of a schematic cross section view of an optical integrated circuit according to another embodiment. It is noted that in this view only the first collimating element 50 is detailed as the enlargement focusses on the part of the optical integrated circuit arranged before the optical component 70 in the optical path. Yet a similar arrangement is to be understood to be present symmetrically on the other side of the optical component 70 for the second collimating element 60. In this embodiment, the first collimating element 50 may comprise a plurality of curved and/or straight lens surfaces 50a-50e arranged in a stack for producing a collimated output light beam towards the receiving surface 71 of the optical component 70. The collimating element 50 may be made of a photo-sensitive material, which has been polymerized locally using a laser and subsequently cured to solidify. A first photo-sensitive material may be filled into the cavity 20 prior to fabrication of the collimating elements 50 and 60. The first photosensitive material may in particular be an epoxy resin. After polymerization, a selective curing may be performed using a mask and light, such that the initial first photosensitive material may then become a polymerized and cured material 82a forming one or more optical surfaces 50a-50h. The material 82a may have interfaces with a cured but non-polymerized (or at least not fully polymerized) material 82b. The cured but non-polymerized material 82b may be obtained by directly curing the initial first photosensitive material without a polymerization step. Cured but non-polymerized material 82b may be present in closed spaces inside the collimating elements 50 and 60, for example in between surfaces 50b and 50c, and/or in part of cavity 20 in the immediate proximity of the collimating elements 50 and 60. To allow insertion of the optical component 70, a portion of the first material 82 may have not been cured in the center of the cavity 20 and may thus be removed, using a solvent like for instance acetone. In the provided recess, the optical component 70 may then be inserted into place, followed by the addition of a second photo-sensitive material. The second photo-sensitive material may be filled in between the material 82b and the surfaces 71 and 72 of the optical component 70. The second photosensitive material may in particular be another epoxy resin than the first epoxy resin used as the first photosensitive material. Alternatively the second photo-sensitive material may be any one of the following material: acrylates, polyurethane, silicones (PDMS), organic ceramic materials like ORMOCER. An additional curing of said second photo-sensitive material may be performed to obtain a cured material 83b for binding the optical component 70 to the collimating elements 50, and 60 via the cured but not polymerized material 82b. Alternatively, the second photo-sensitive material may be same material as the first photo-sensitive material.

It is noted that the collimating element 50 of FIG. 2 is not to be understood as limitative but purely as illustrative of a possible arrangement of a plurality of micro-lenses. The number of surfaces, the curvatures of these surfaces and the dimensions of a collimating element 50 or 60 may be selected based on design parameters of a specific optical integrated circuit 100, including the wavelength of the light to be received and the diameter of the optical waveguides 30 and 40 among others. A skilled person would know based on common general knowledge how to design a collimating element 50 and 60 for each situation based on a set of design parameters (radius of curvature, refractive index, wavelength, size of optical waveguide, birefringence, aberration).

The cured but non-polymerized first and second photosensitive materials 82b and 83b may act as binding (adhesive) material for binding the elements 50, 60 and 70 together inside the cavity 20. The materials 82b and/or 83b may have a reflective index close to the reflective index of the material 82a of the collimating elements 50 and 60 in order to minimize reflections at the interface surfaces between the two materials 82a and 82b, and/or 83b. The materials 82b and/or 83b may have a reflective index preferably between 1.45 and 1.6.

In an alternative embodiment (not illustrated), the material 82b remaining accessible in the cavity (i.e. not captive in closed spaces inside the collimating elements) may be entirely removed after curing and replaced by the second binding photo-sensitive material 83b. In still another embodiment, the optical component 70 may be inserted while the first photo-sensitive material 82 is still liquid, such that after laser printing, i.e. after polymerization of the areas representing the collimating elements, the whole cavity 20 including the polymerized elements and the optical component 70 is cured, to solidify the elements 50 and 60 in the same step as the binding of all elements 50-70 in the cavity 20. In particular, when using the photo-sensitive material used for the collimating element as unique binding material, a simple and cheaper optical integrated circuit is obtained, while when using a second photo-sensitive material for binding, the binding characteristics may be adapted to the environmental constraints of a specific application (vibrations, moisture, etc.).

Figure 3A:
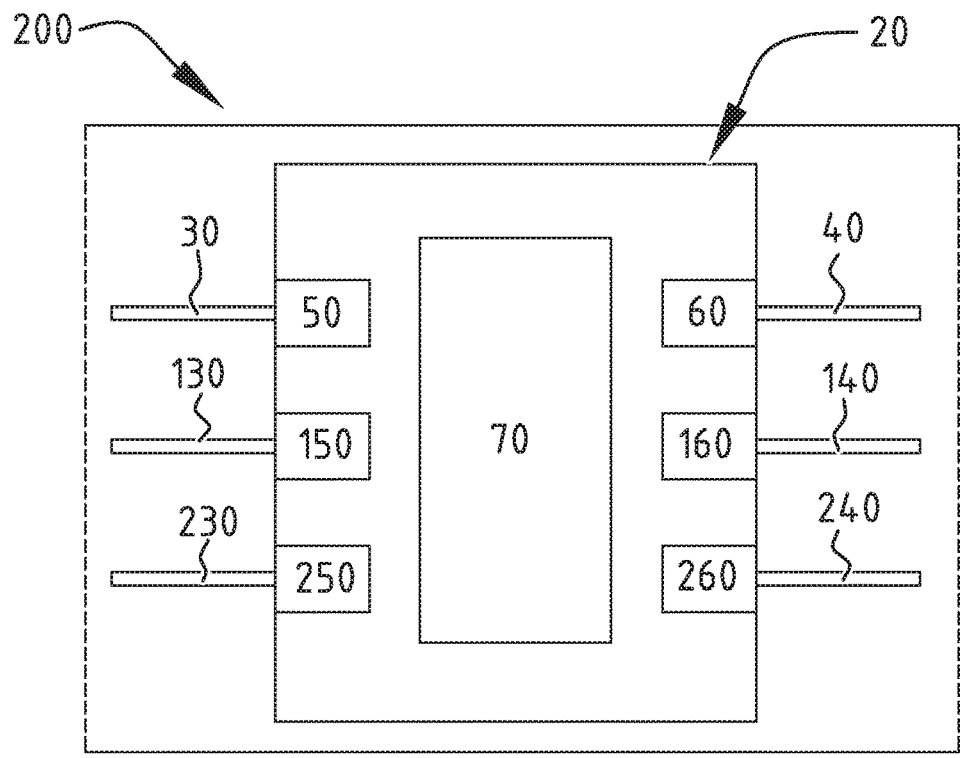
FIGS. 3A and 3B illustrate schematic views from above of optical integrated circuits according to further embodiments.
Figure 3B:
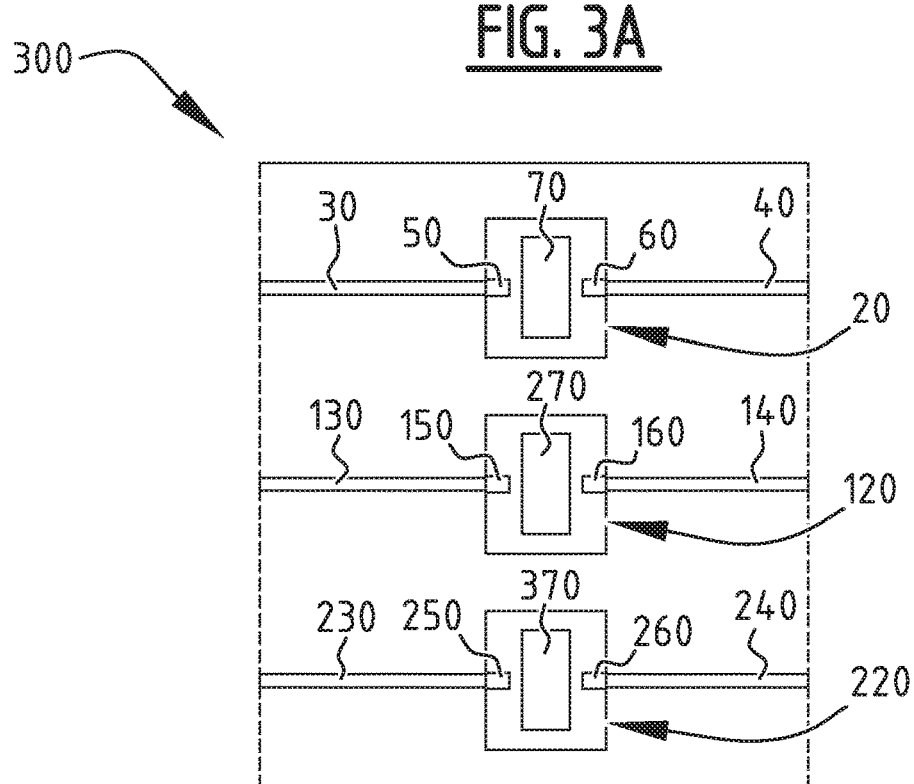

FIGS. 3A and 3B illustrates schematic views from above of other embodiments of the invention. In FIG. 3A, an optical integrated circuit 200 is shown where three sets of first and second optical waveguides (30, 40), (130, 140), (230, 240) are arranged to end in the same cavity 20 of the substrate 10. Three optical paths, also called optical channels, may in this way be arranged close to each other. A minimum distance between two sets of optical waveguides may for instance be in the range of tens of microns. Each set of optical waveguides (30, 40), (130, 140), (230, 240) is provided with dedicated collimated first and second collimated elements (50, 60), (150, 160), (250, 260) but share the same optical component 70. In this way, a compact multi-channel integrated circuit sharing the same optical function may be achieved.

In FIG. 3B, an optical integrated circuit 300 is shown where three sets of first and second optical waveguides (30, 40), (130, 140), (230, 240), may be arranged in the same substrate 10 but end into different respective cavities 20, 120, 220 arranged in the substrate 10. Each set of optical waveguides (30, 40), (130, 140), (230, 240) may be provided with dedicated collimated first and second collimated elements (50, 60), (150, 160), (250, 260) and a dedicated optical component 70, 170, 270. The optical integrated circuit 300 of FIG. 3 may accommodate a plurality of identical or different optical functions 70, 170, 270 on the same substrate 10. The optical integrated circuit 300 may then be cut after fabrication into smaller optical integrated circuits 100, each comprising one function only.

Figure 4:
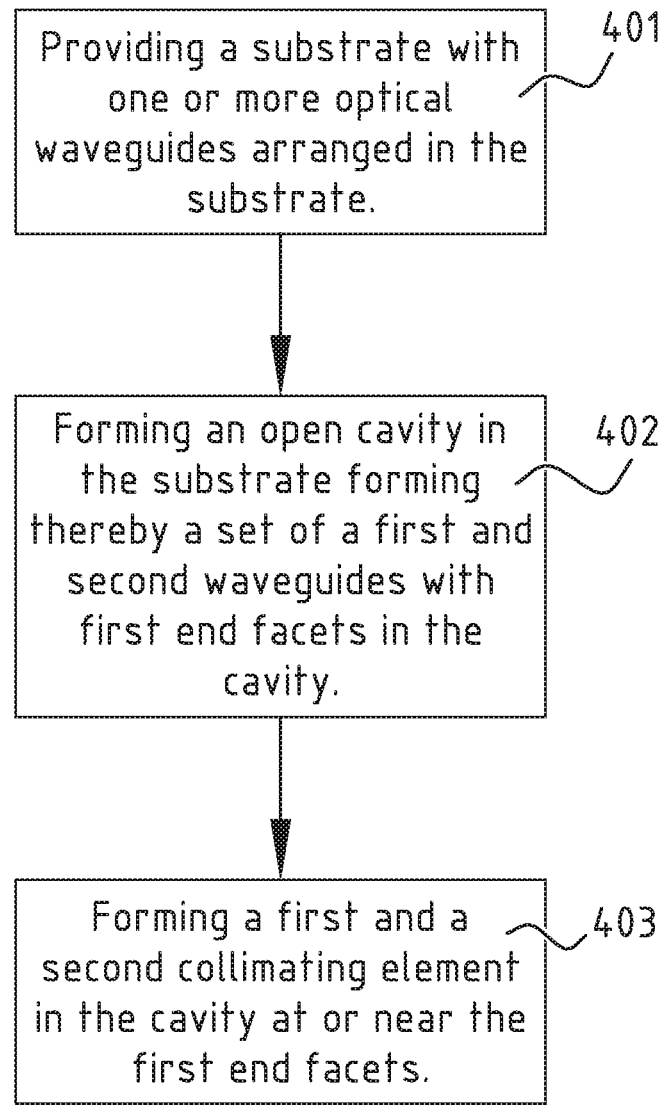
FIG. 4 illustrate the fabrication method according to an embodiment.

FIG. 4 illustrate the fabrication method according to an embodiment. The method for fabricating an optical integrated circuit 100 comprises the step 401 of providing a substrate with one or more optical waveguides arranged in the substrate, followed by step 402 of etching an open cavity in the substrate forming thereby a set of a first and a second waveguides each with first end facets ending in the cavity. The following step 403 comprises forming a first and second collimating element in the cavity at or near the first end facets of the first and second optical waveguides. Step 404 is optional and may comprise inserting an optical component between the first and the second collimating elements. It is noted that some further intermediate steps may be present, and that the last two steps may be inverted.

FIGS. 5A-5I illustrate schematically fabrication steps of an optical integrated circuit 100 according to an embodiment of the invention. Although explained for an optical integrated circuit 100 as in FIGS. 1 and 2, a skilled person would know how to decline similar fabrications steps for the optical integrated circuits 200 and 300 of FIGS. 3A and 3B.

Figure 5A:
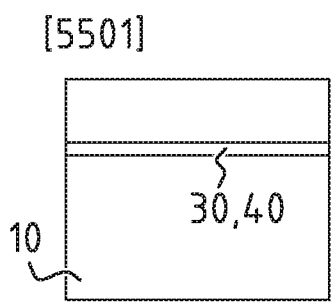
FIGS. 5A-5I illustrate schematically the fabrication process of an optical integrated circuit according to an embodiment.

FIG. 5A illustrates a step [S501] in which an optical waveguide labelled 30, 40 may be provided in the substrate 10.

Figure 5B:
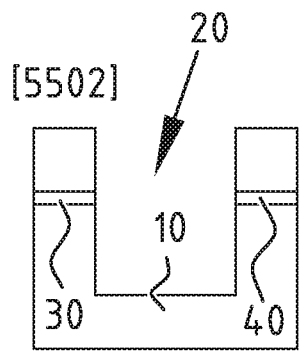

FIG. 5B illustrates a subsequent step [S502] in which a cavity 20 may be provided, for example etched, in the substrate 10 through the optical waveguide 30, 40 interrupting said waveguide 30, 40 in two segments thereby forming a set of a first waveguide 30 and a second waveguide 40. The first and second waveguides 30 and 40 may then be intrinsically aligned as they would derive from a single optical waveguide.

Figure 5C:
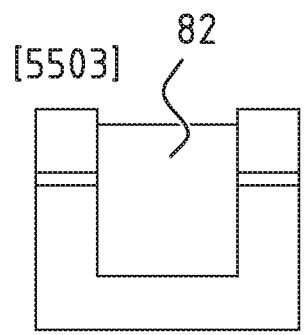

FIG. 5C illustrates a subsequent step [S503] in which the cavity 20 may be filled with a first photo-sensitive material 82, for example a liquid material may be applied to the cavity 20 by spin-coating or by a needle dispenser.

Figure 5D:
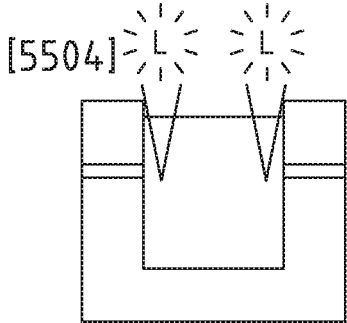

FIG. 5D illustrates a subsequent step [S504] in which a laser, labelled L, may be used to locally polymerize the first photo-sensitive material 82 to form the first and second collimating elements 50 and 60. This step [S504] may for example be performed using two photon absorption laser lithography as known in the art.

Figure 5E:
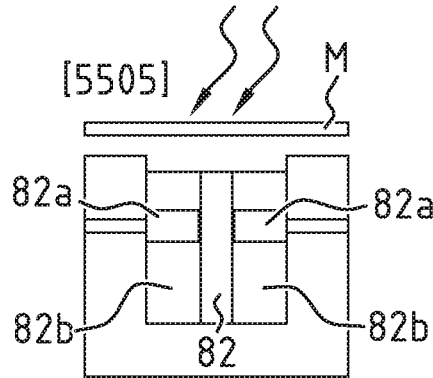

FIG. 5E illustrates a subsequent step [S505] in which the first photo-sensitive material 82 is selectively cured using a mask to finally obtain the first and second collimating elements 50 and 60 made of cured and polymerized material 82a, while the cured but not (fully) polymerized material 82b may act as a mechanical support for supporting the first and second collimating elements inside the cavity 20. This step [S505] may be performed using curing methods known in the art.

Figure 5F:
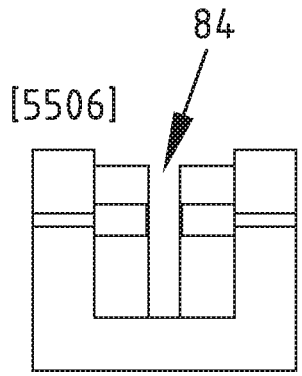

FIG. 5F illustrates a subsequent step [S506] in which the non cured material 82 is removed from the cavity, using a solvent (for example acetone), creating a recess 84. The walls of the recess 84 may be formed by cured and polymerized material 82a and cured but not (fully) polymerized material 82b. The recess 84 may be dimensioned to receive an optical element 70. The walls of the recess 84 may be arranged such that the optical element 70 may be arranged in close proximity to the first and second collimating elements 50 and 60.

Figure 5G:
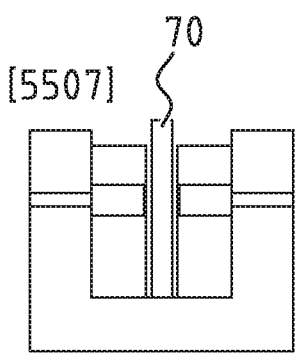

FIG. 5G illustrates a subsequent step [S507] in which an optical component 70 may be inserted in the recess 84. This step may be performed by a machine suitable for handling a bulk optical component 70.

Figure 5H:
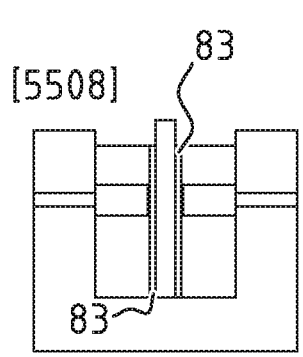

FIG. 5H illustrates a subsequent step [S508] in which the remaining space in the recess 84, once the optical component 70 has been inserted, may be filled with a second photo-sensitive material 83, for example a liquid material may be applied by a needle dispenser.

Figure 5I:
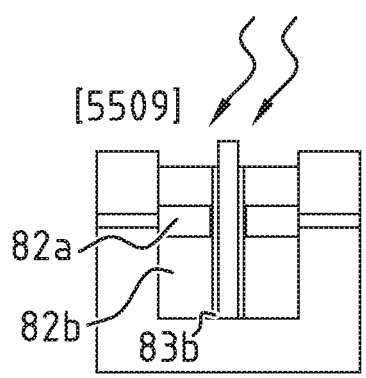

FIG. 5I illustrates a step [S509] in which the second photo-sensitive material 83 is cured to create a binding material 83b, binding, via the material 82b, together the elements 50-70 inside the cavity 20.

FIGS. 6A-6D illustrate schematic views from above of different packaging embodiments for an optical integrated circuit of the invention.

Figure 6A:
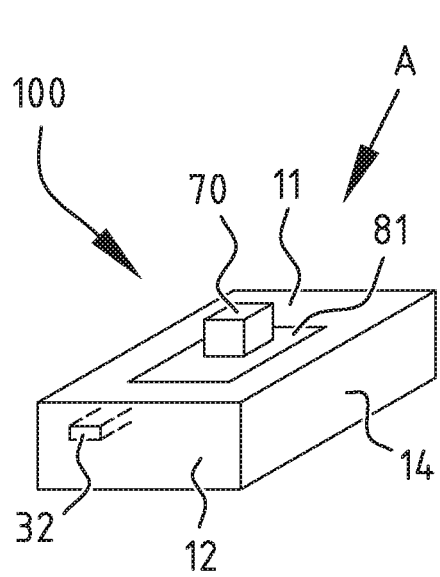
FIGS. 6A-6D illustrate schematic views of different packaging embodiments for an optical integrated circuit of the invention.

FIG. 6A illustrates a schematic perspective view from above of an optical integrated module A. The module A may comprise an optical integrated circuit 100 according to the embodiment of FIGS. 1 and 2 as illustrated, or alternatively (not illustrated) an optical integrated circuit 200 or 300 according to embodiments of FIGS. 3A and 3B. The first and second optical waveguides 30 and 40 may comprise second end facets 32 and 42 at the opposite end of the first and second optical waveguides 30, 40 with respect to the first end facets 31 and 41. The module A may be packaged as a chip having an upper surface 11, a lower surface (not labelled), a first set of two opposite side surfaces including a surface 12 illustrated in FIG. 6A, at or near which the second end facets are provided, for instance end facet 32 may be provide at the surface 12, and a second set of opposite side surfaces including a surface 14 illustrated in FIG. 6A. Module A may be arranged in between two chips, for instance in between a laser chip and an SiN chip. Connection to other chips may be performed by putting the side surfaces of the module A in contact with side surfaces of the other chips(s).

Figure 6B:
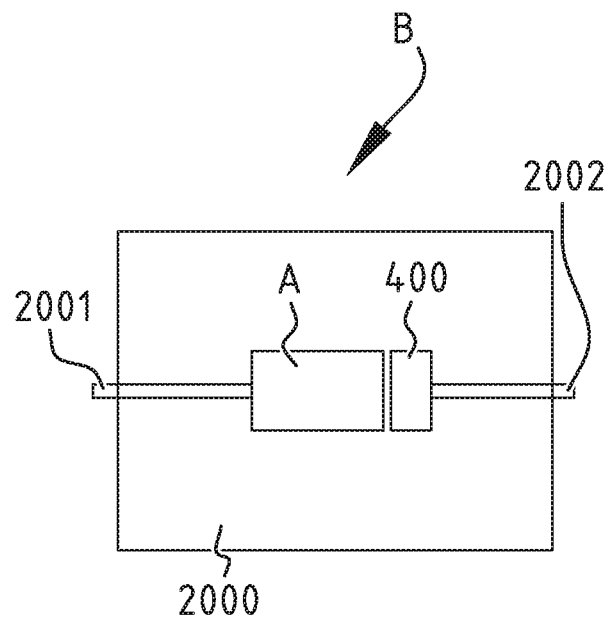

FIG. 6B illustrates a schematic view from above of an optical integrated module B. The module B may comprise a packaging 2000 with an input interface 2001 and an output interface 2002. Arranged inside said packaging 1000, a module A according to FIG. 6A may be provided, as well as at least one spot-size converter (SSC) 400, and possibly one SSC on each side of the module A for adapting the mode field from optical waveguide to fiber and/or from fiber to optical waveguide. The input interface 1001 may be, if an input SSC 400 is present, a fiber interface for one or more channels (fiber array interface), otherwise an optical waveguide interface for one or more channels suitable for inter-facing with another input optical integrated circuit, and the output interface 2002 may be, if an output SSC is present, a fiber interface for one or more channels (fiber array interface) otherwise an optical waveguide interface for one or more channels suitable for interfacing with another input optical integrated circuit.

Figure 6C:
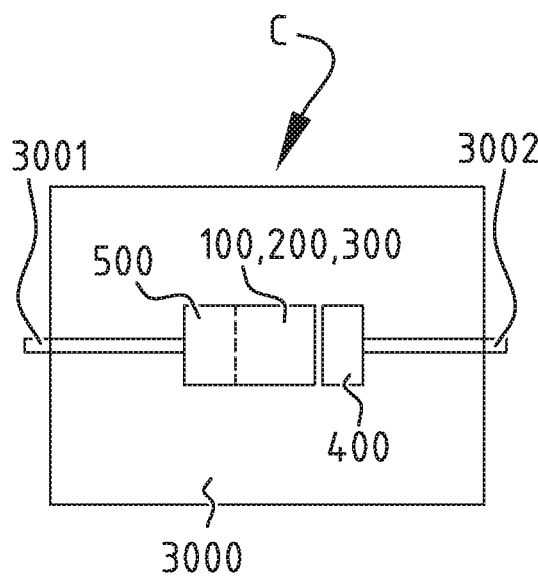

FIG. 6C illustrates a schematic view from above of an optical integrated module C. The module C may comprise a packaging 3000 with an input interface 3001 and an output interface 3002. Arranged inside said packaging 3000, an optical integrated circuit 100, 200 or 300 etched on the same substrate 10 as an additional optical integrated circuit 500 may be provided together with a spot-size converter 400 for adapting the mode field from optical waveguide to fiber. The optical integrated circuit may for instance be a laser circuit for generating the light signal to be transmitted to the optical integrated circuit 100, 200 or 300. The input interface 3001 may be an interface for interfacing with the circuit 500, and the output interface 3002 may be a fiber interface for one or more channels (fiber array interface).

Figure 6D:
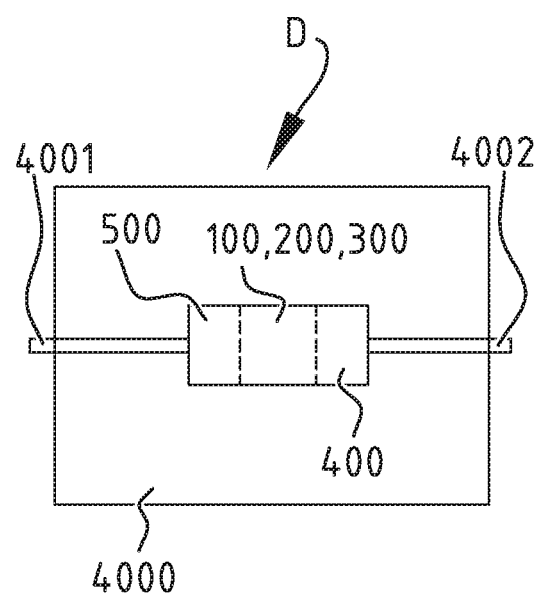

FIG. 6D illustrates a schematic view from above of an optical integrated module D. The module D may comprise a packaging 4000 with an input interface 4001 and an output interface 4002. Arranged inside said packaging 4000, an optical integrated circuit 100, 200 or 300 etched on the same substrate 10 as an additional optical integrated circuit 500 and etched on the same substrate as a spot-size converter 400 for adapting the mode field from optical waveguide to fiber. The input interface 4001 may be an interface for interfacing with the circuit 500, and the output interface 4002 may be a fiber interface for one or more channels (fiber array interface).

The packagings 2000, 3000 and 4000 may comprise a metallic housing, for instance a gold housing.

Whilst the principles of the invention have been set out above in connection with specific embodiments, it is understood that this description is merely made by way of example and not as a limitation of the scope of protection which is determined by the appended claims.

The invention claimed is:

1. An optical integrated circuit, comprising:
   a substrate,
   at least one open cavity provided in said substrate,
   at least one set of optical waveguides for each open cavity, each set comprising a first optical waveguide and a second optical waveguide, wherein the first optical waveguide and the second optical waveguide of a set are each arranged in the substrate and each comprise a first end facet ending in the open cavity of that set,
   a first collimating element for each set, the first collimating element of a set being arranged in the open cavity of that set at or near the first end facet of the first optical waveguide of that set to collimate light from that first optical waveguide, and
   a second collimating element for each set, the second collimating element of a set being arranged in the open cavity of that set at or near the first end facet of the second optical waveguide of that set to collimate light into that second optical waveguide,
   wherein the first optical waveguide and the second optical waveguide of a set are different segments of an optical waveguide that is interrupted by the open cavity of that set, and
   wherein the first and second collimating elements are made of polymerized and cured photo-sensitive material having a first refractive index,
   further comprising arranged in the cavity cured but not polymerized material, having a second refractive index different from the first refractive index and acting as a mechanical support for supporting the first and second collimating elements; further comprising a binding material in a recess to secure an optical component between the first and second collimating elements.

2. The optical integrated circuit according to claim 1, wherein each of the first and second collimating elements comprises one or more micro lenses.

3. The optical integrated circuit according to claim 1, wherein the first and second collimating elements are made of polymerized and cured epoxy resin, or irradiated and cured glass.

4. The optical integrated circuit according to claim 1, further comprising at least one optical component arranged in each open cavity between the first and the second collimating elements of the at least one set of that open cavity, said optical component being configured to perform an optical function.

5. The optical integrated circuit according to claim 4, comprising at least two sets of optical waveguides for each open cavity, wherein the optical component of an open cavity is shared by the at least two sets of optical waveguides for that open cavity.

6. The optical integrated circuit according to claim 4, wherein the optical component is for performing one of the following functions: optical isolation, sensing, beam splitting, beam deflection or plasmonics, in particular wherein the optical component is one of an optical isolator, a drop of fluid or a beam manipulator.

7. The optical integrated circuit according to claim 4, wherein the optical component is a bulk optical component.

8. The optical integrated circuit according to claim 1, wherein the at least one optical component is arranged in a recess created when removing non-cured material from the cavity after forming the first and second collimating element and the mechanical support thereof.

9. The optical integrated circuit according to claim 1, wherein the binding material has a refractive index close to the refractive index of the material of the collimating elements.

10. The optical integrated circuit according to claim 9, wherein the binding material is a cured photo-sensitive material.

11. The optical integrated circuit according to claim 1, comprising at least two open cavities provided in said substrate.

12. An optical integrated module comprising:
    a packaging with input and output interfaces, and
    an optical integrated circuit according to claim 1, arranged inside said packaging, wherein at least a first optical waveguide is connected directly or indirectly to the input interface and/or at least a second optical waveguide is connected directly or indirectly to the output interface.

13. The optical integrated module according to claim 12, further comprising a pre-processing stage for processing one or more light signals to be guided in the one or more first optical waveguides and/or a post-processing stage for processing one or more light signals from the one or more second optical waveguides, in particular wherein the pre-processing stage comprises a laser integrated circuit and/or a spot-size converter for adapting the mode size, and/or wherein the post-processing stage comprises a spot-size converter for adapting the mode size.

14. A method for fabricating an optical integrated circuit, comprising the steps of:
    providing a substrate with one or more optical waveguides arranged in the substrate;

forming, for example by means of etching, at least one open cavity in the substrate, thereby forming at least one set of optical waveguides for each open cavity, each set comprising a first optical waveguide and a second optical waveguide, wherein the first optical waveguide and the second optical waveguide of a set are each arranged in the substrate and each comprise a first end facet ending in the open cavity of that set, and forming in the open cavity of a set and for each set a first collimating element at or near the first end facet of the first optical waveguide of that set and a second collimating element at the first end facet of the second optical waveguide of that set, wherein forming, for example by means of etching, each open cavity comprises etching through at least one optical waveguide interrupting at least that optical waveguide in different segments thereby forming the at least one set of optical waveguides for each open cavity, and wherein forming the collimating elements comprises filling the open cavity of a set with a first photo-sensitive material, locally polymerizing said first photo-sensitive material and subsequently curing the polymerized first photo-sensitive material to obtain the first and second collimating elements having a first refractive index, and curing but not polymerizing material arranged in the cavity, to obtain material having a second refractive index different from the first refractive index and acting as a mechanical support for supporting the first and second collimating elements; further comprising providing a binding material in a recess formed to secure an optical component between the first and second collimating elements.

15. The method of claim 14, wherein forming the collimating elements comprises 3D printing the collimating elements.

16. The method of claim 15, further comprising the subsequent steps of removing at least part of the non-polymerized first photo-sensitive material from the open cavity of that set, refilling the cavity of that set with a second photo-sensitive material and after the inserting step, curing said second photo-sensitive material wherein in particular the second photo-sensitive material is different from the first photo-sensitive material.

17. The method of claim 14, wherein forming the collimating elements is performed by two photon absorption laser lithography.

18. The method of claim 14, further comprising inserting at least one optical component in each open cavity between the first and the second collimating elements of the at least one set of that open cavity, said optical component being configured to perform an optical function.

19. The method of claim 14, wherein providing a substrate with one or more optical waveguides arranged in the substrate comprises providing a first substrate portion with one or more optical waveguides arranged in the substrate, and at least one second substrate portion incorporating at least one of a pre-processing stage for processing one or more light signals to be guided in the one or more first optical waveguides or a post-processing stage for processing one or more light signals from the one or more second optical waveguides.

* * * * *